United States Patent [19]

Frei et al.

[11] 3,825,832

[45] July 23, 1974

[54] METHOD AND DEVICE FOR CODING AND DECODING VIDEO SIGNALS

[75] Inventors: Armin H. Frei, Rueschlikon; Hans R. Schindler, Au; Peter Vettiger, Thalwil, all of Switzerland

[73] Assignee: International Business Machines Corporation, Armonk, N.Y.

[22] Filed: May 22, 1972

[21] Appl. No.: 255,489

[30] Foreign Application Priority Data

Jan. 5, 1972 Switzerland ........................ 8113/71

[52] U.S. Cl. .......................... 325/38 B, 178/DIG. 3

[51] Int. Cl. ............................................ H03k 13/22

[58] Field of Search............340/174.1 G, 347 AD, 340/347 DD, 347 DF, 349, 354, 355; 179/15.55 R, 15 BW, 15 AP, 15 BU; 325/38 B; 178/DIG. 3, 68; 332/11 P, 11 R

[56] References Cited

UNITED STATES PATENTS 3,403,226 9/1968 Wintringham ................ 178/DIG. 3

3,688,029 8/1972 Bartoe, Jr. et al. ........... 178/DIG. 3

OTHER PUBLICATIONS

IEEE Spectrum, October 1970, pp. 69–78, "Delta Modulation"; H. R. Schindler.

IBM Technical Disclosure Bulletin, Vol. 13, No. 8, January 1971, P2241–2242.

*Primary Examiner*—Benedict V. Safourek

*Attorney, Agent, or Firm*—Victor Siber

[57] ABSTRACT

Method and device for coding and decoding video signals employing two different modes: Delta Coding for regions of minor amplitude changes, and DPCM Coding for edges which exhibit large amplitude changes. Switching between modes is effected by the bit stream carrying the video information, with a minimum of extra marker bits. Further improvement is achieved by using a higher scanning frequency for delta coding and transferring a reduced number of bits extracted by majority selection.

12 Claims, 11 Drawing Figures

| DELTA CODE AT TRANSMITTER (UNCOMPRESSED) | MODE | CODE TRANSMITTED | DELTA CODE AT RECEIVER (RECONSTRUCTED) |
|---|---|---|---|
| 0 0 1 | | | 0 1 0 |
| 0 1 0 | DELTA | 0 | 0 1 0 |
| 1 0 0 | | | 0 1 0 |
| 0 1 1 | | | 1 0 1 |
| 1 0 1 | DELTA | 1 | 1 0 1 |
| 1 1 0 | | | 1 0 1 |
| 0 0 0 | DELTA → DPCM | 0 0 0 | 0 0 0 (TRANSITION) |
| 1 1 1 | | 1 1 1 | 1 1 1 (TRANSITION) |

DELTA → DELTA

DELTA → DPCM

METHOD AND DEVICE FOR CODING AND DECODING VIDEO SIGNALS

BACKGROUND OF THE INVENTION

The invention relates to a method for coding and decoding video signals and a device for practicing this method.

In the coding of a video signal that was generated by character scanning of a picture, $2^n$ bits per picture element are required if $2^n$ different grey levels are desired, e.g., 6 bits per picture element for 64 levels. However, because a video signal contains much redundant or irrelevant information which is not required for a reconstruction of the picture with sufficient quality, it has been found that considerable savings are possible by using coding processes that take advantage of the following video information characteristics. First, the picture elements within a picture as well as in two consecutive pictures are statistically dependent on each other. Second, certain picture changes are not perceptible at all by the human viewer because of the characteristics of the eye and of the visual process. Third, in many applications one does accept minor reductions in quality in the picture reconstruction provided at least the essential information is preserved.

A reduction in number of bits per picture element which are required for coding results in considerable savings for the transmission time as well as in storage requirements for the coded information. Several methods for information reduction in the coding process have already been proposed in the prior art. In one known method, the information of an entire picture is stored, then data is selected and coded for a picture element only if it exhibits an intensity difference between two consecutive pictures, which difference is greater than a fixed threshold value. With such a method only one bit per picture element is required. This seems to be the minimum which can be achieved; however, this method is complex and costly and therefore, it is not suited for widespread application.

Other known methods are based on the fact that most pictures exhibit large areas of small intensity differences (light, dark areas) and, have limited areas with intensity transistion (edges between light and dark). For these two kinds of information one can use two different coding principles.

In U.S. Pat. No. 3,071,727 it is suggested to code the picture elements in areas of small variations by 8-bit-PCM (Pulse Code Modulation) words, and to use at the transitions 4-bit-differential-PCM-coding. An additional mode bit is required for each code word containing 8 bits or 2 × 4 bits respectively, in order to state the coding mode. This method requires a relatively large number of bits per picture element particularly if the "flat" regions constitute the major part of the picture.

U.S. Pat. No. 3,403,226 discloses a method in which the scanning points are processed in groups. One value of each group is coded by an 8-bit-PCM word, the others are represented by 4-bit-differential-PCM. A position indication in coded form must be added to the full coded value of each group so that the required number of bits is increased. Furthermore, the scanning values for a whole group of picture elements must always be stored and evaluated together.

Another known technique is a two-mode coding method which is disclosed in an article "Stop-Scan Edge Detection System for Interplanetary Television Transmission" by W.K. Pratt, published in the Conference Proceedings "IRE National Symposium on Space Electronics and Telemetry, 1962" (paper 43). In this method the edges, or transistions in intensity, are represented by two coded items; 3 bits for the amplitude (differential PCM) and 4 bits for the position of the transition. Furthermore, the complete picture information is coded by delta modulation after filtering out the higher frequency constituents of the transitions. One disadvantage of this method is the necessary treatment of the signals in two different ways. The picture information must be scanned twice or it must be stored after the first evaluation until the second evaluation is completed. In the receiver the video signal must be reconstructed from two constituents. A further disadvantage is that for each transition, both the bit position and the amplitude information must be stated, which requires 4 bits each time.

OBJECTS OF THE INVENTION

Therefore, it is an object of the present invention to provide an improved coding method for video information.

It is a further object of the present invention to provide a coding method for video information that results in a minimum amount of binary information per picture element.

It is a further object of the present invention to provide a coding method for video information which uses a combination of two particularly suited coding modes and a small number of control and auxiliary bits that do not transmit actual picture information.

It is a further object of the present invention to provide a video information coding method by a combination of delta modulation or differential pulse code modulation in two separate modes depending on the course of the amplitude of the video signal, and by the use of code bit groups to indicate transitions from one coding mode to the other.

The foregoing and other objects, features and advantages of the invention will be apparent from the following more particular description of a preferred embodiment of the invention, as illustrated in the accompanying drawings.

SUMMARY OF THE INVENTION

In the present invention a method and apparatus for coding video signals is provided. Video signals are coded in one of two modes depending on characteristic information of the video information. The video signals are examined and depending on the course of amplitude of the signal, they are coded by either delta modulation or differential pulse code modulation (DPCM). A transition from delta modulation to DPCM is made when the appearance of certain combination of delta bits are present. The transition to delta coding takes place when certain pairs of DPCM code words are observed. There is no requirement for particular position data in order to achieve a particular transistion.

FIG. *5a* and *5b* are schematic representations of the insertion of marker bits for the distinction of bit patterns which are equal.

Figure 6A:
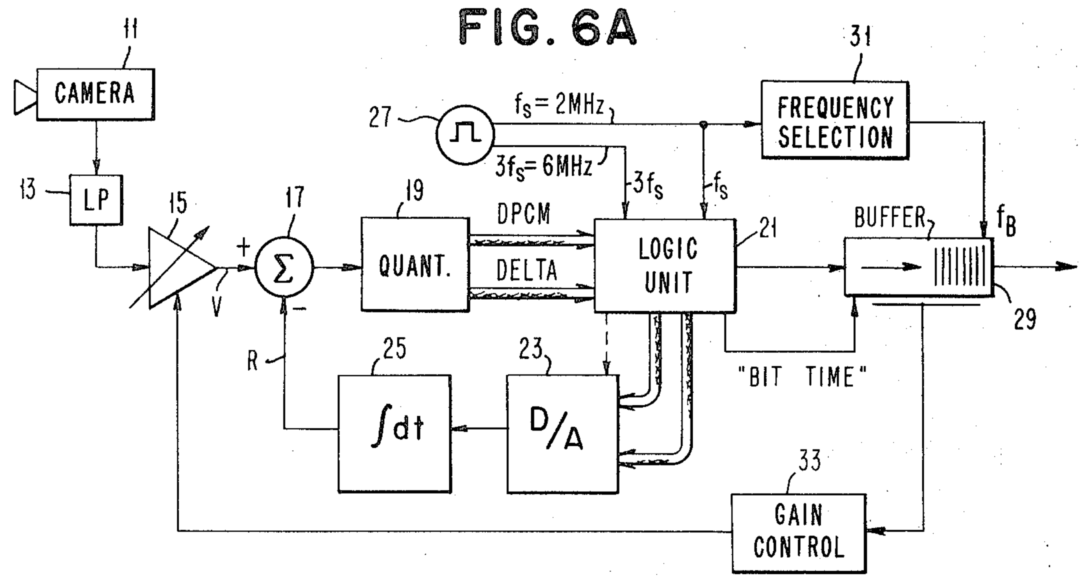
Figure 6B:
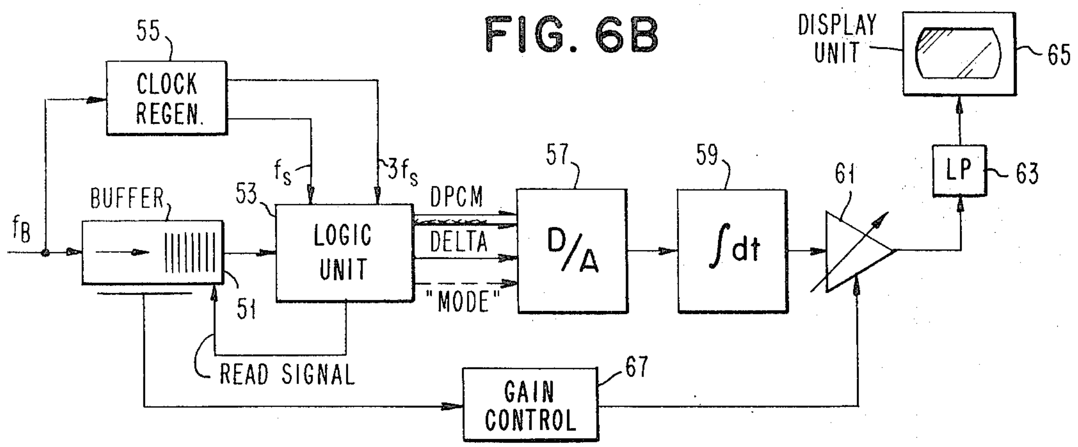
Figure 6C:
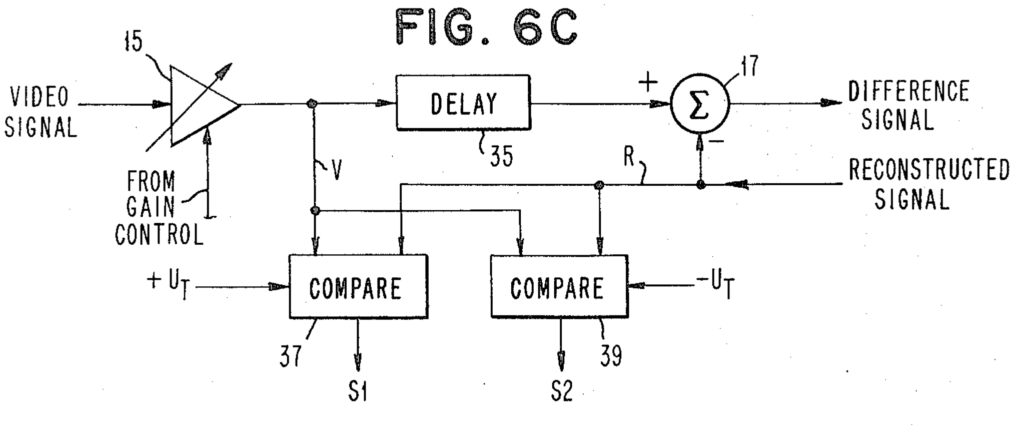

FIGS. 6A, 6B and 6C are block diagrams of a coder and a decoder for exercising the method of the invention.

Figure 7A:
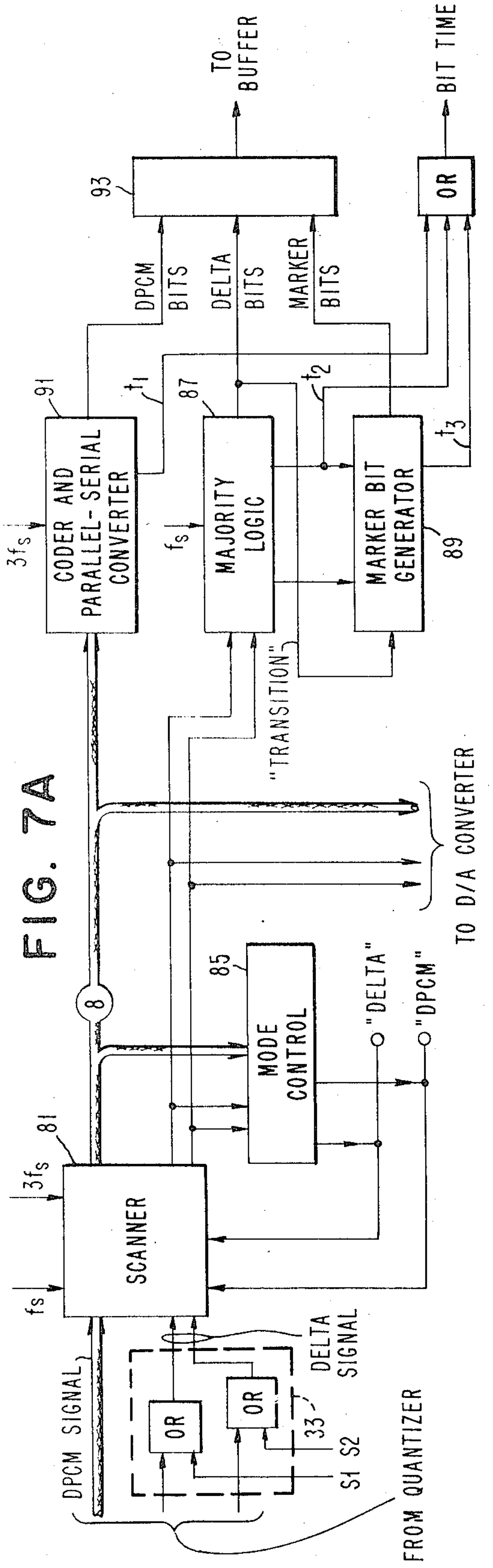
Figure 7B:
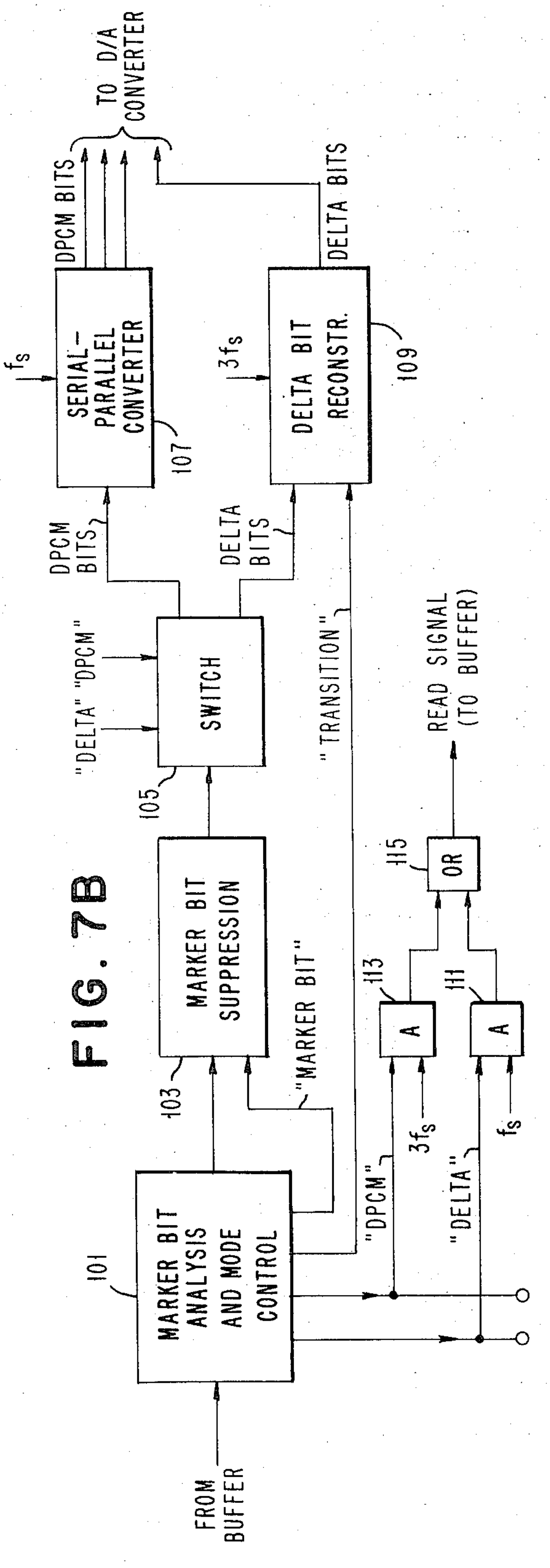

FIGS. 7A and 7B are block diagrams of the logic units for a coder and decoder according to FIGS. 6A and 6B.

DESCRIPTION OF THE INVENTION

Delta Coding

Figures 1, 2:
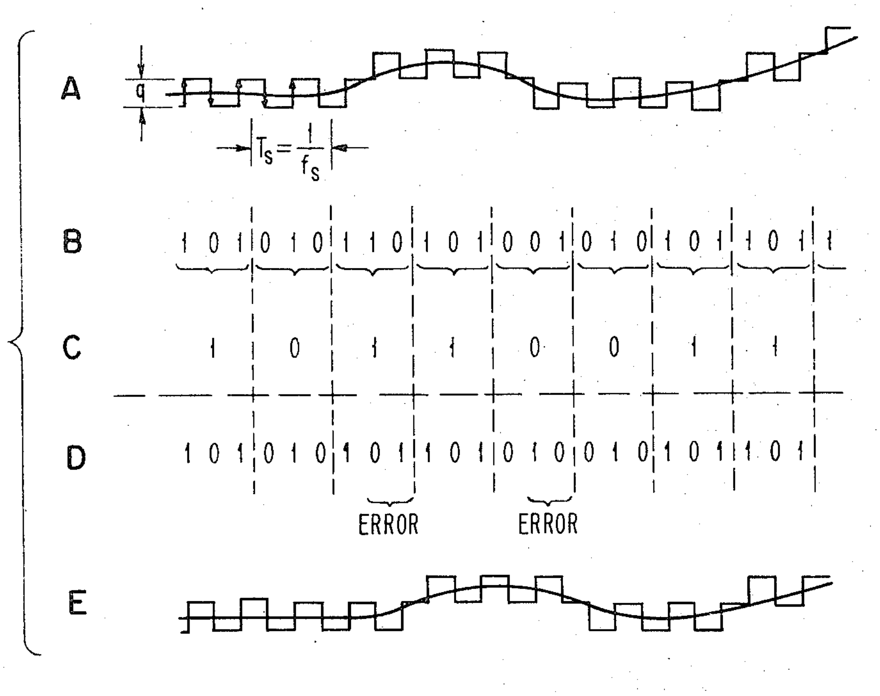
FIG. 1 is a schematic representation of the delta coding with triple scanning frequency and majority selection for reduction of the number of bits to be transmitted.
FIG. 2 is a schematic representation of the majority selection and the bit reconstruction for a delta coding method according to FIG. 1.

The delta coding of signal intervals of small amplitude variation is effected according to a specific scheme which is represented in FIGS. 1 and 2. First, an assumption is made that the signal to be digitized has to be scanned at least with the nyquist-frequency $f_s = 2f_g$, $f_g$ being the frequency limit of the video signal to be transmitted.

In the coding method described herein the scanning frequency for delta coding is three times the Nyquist-frequency, i.e., $3f_s$. Therefore, three delta bits are generated for each Nyquist-interval as is shown in lines 1A and 1B of FIG. 1. Of each 3-bit-group, however, generally only one bit is transmitted which corresponds to the bit value having the majority in the group of three. Line 1B shows the uncompressed coding and line 1C the compressed coding. Thus, despite the scanning rate of $3f_s$ a bit rate of only $f_s$ is necessary for transmission. On the receiver side, the bit group 101 is reconstructed schematically from each 1, and from each 0 the bit group 010 is reconstructed. Based on these bit groups the signal is regenerated by adding or subtracting, respectively, the amplitude quantum q. The errors which are generated by the schematic decompression are only small as can be seen from lines 1D and 1E.

The complete scheme for compression of the delta coding on the sender side (coder) and for the reconstruction on the receiver side (decoder) is shown in the table of FIG. 2. The two last lines of this table contain the exceptions in which no compression, or no majority selection, is effected because in these two cases the uncompressed delta bits are used as groups of three for characterizing a switching from delta coding to DPCM coding.

It is assumed that in those cases where consecutively, a delta step is necessary in the same direction (positive or negative) for three times, then a further steep increase or decrease in amplitude will follow for which DPCM coding is more suitable than delta coding. Therefore, at these points a switching is effected. This process is described further in connection with FIG. 4.

DPCM Coding

For DPCM coding the amplitude differences are scanned only with the basic scanning frequency $f_s$. Each difference value is represented by a 3-bit-code word so that eight different values can be represented.

Figure 3:
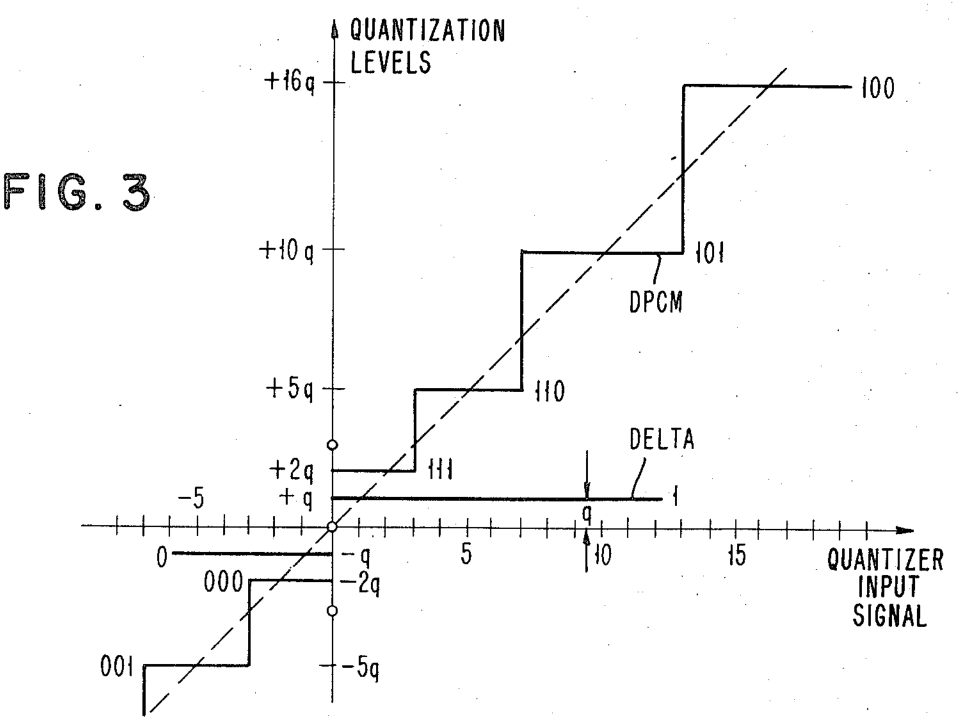
FIG. 3 is a quantization characteristic for DPCM with varying differences between the quantization levels.

One possible quantization characteristic for DPCM coding is shown in FIG. 3. The non-linearity of the characteristic (larger difference between quantization levels for larger difference values) takes advantage of the fact that the error tolerance of the human eye is dependent on the amplitude difference, in order to increase the range of coding for a given number of bits. Also in FIG. 3, the quantization characteristic for delta coding is shown, which runs parallel to the abscissa in the distance of +q or −q, respectively (quantization step only dependent on the sign, not dependent on the absolute value of the difference signal). The most suitable values for the quantization levels in DPCM are best found by an empirical approach. It should be noted that the quantization level could be variable and adaptable at the coder. The smallest that the DPCM value could be, e.g., 1,5 q or 3 q instead of 2 q.

Coding Example with Switching between two Coding Modes.

Figure 4:
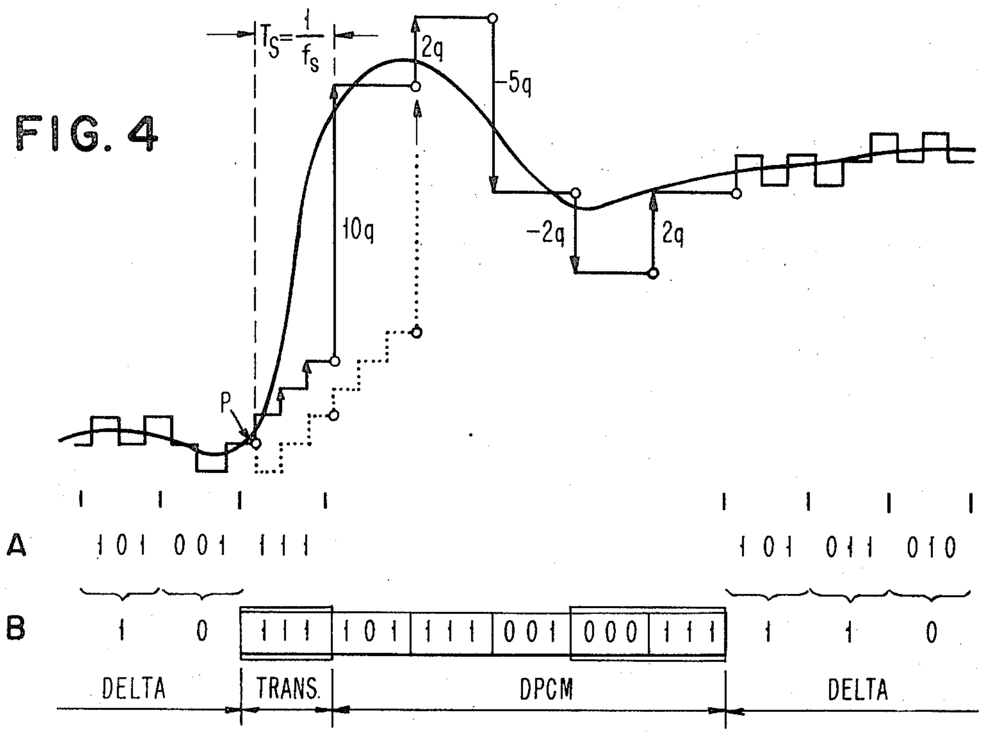
FIG. 4 is an example of a video signal interval showing the coding in two different coding modes together with switching between the two modes.

In FIG. 4 an example is shown of coding a signal interval according to the method of the invention. The continuous curve represents the original video signal, the staircase curve the signal reconstructed from the coded values. The difference between the staircase curve and the continuous curve is the difference signal which is to be coded. Line A shows the uncompressed delta bits, line B the code bits (delta) or code words (DPCM), respectively, which are transmitted.

On the left side of line A there are two groups of unequal delta bits which are generated by scanning with a frequency $3f_s$, and from each of which, as shown in FIG. 2, one majority bit is selected. Thereafter, the steep increase of the video signal starts so that the delta bit group 111 is generated. This group will not be compressed and is transmitted without change; however, it effects a switching to DPCM coding. The switching function is indicated by the double bars at the box of this bit group in line B. From this point on, scanning is done with basic frequency $f_s$. Therefore, the step width is three times as large. In each scanning instant the difference value is coded by three bits (one box each in line B) according to the characteristic of FIG. 3.

Now, the case of switching back from DPCM to delta coding is considered. When the video signal again enters a flat area, then the staircase curve reconstructed from the DPCM code words swings up and down ("idling" - as in delta coding of constant amplitude values). At this point a transition to delta mode is desired. The indication may be either an n-times alternation of the sign (first bit of each code word) without consideration of the amplitude value, or a single alternation of the sign with the second code word representing the smallest DPCM value. The second solution has been adopted for this example and is shown in FIG. 4. It should be recognized that there are other possibilities for identification of a transition.

In line B of FIG. 4 the two code words by which the transition to the other coding mode is recognized, are indicated by double bars (000 and 111). After the appearance of the second of these two code words, coding is again in the delta mode. Scanning, as before, is done with the triple frequency $3f_s$ and from each group of three delta bits the majority bit is selected for transmission, as has been shown for the three bit groups on the right side of lines A and B.

For clarification a survey of the different scanning frequencies and bit rates for the transmitted codes is provided as follows:

In delta coding the scanning is effected with triple frequency $3f_s$. The bit rate for the code to be transmitted, however, is only $f_s$ because of the majority selection. In DPCM coding, scanning is effected with the basic frequency $f_s$. However, three bits are generated each time the bit rate for the code words to be transmitted is $3f_s$. The actual transmission is not in two different bit rates but with a constant mean bit rate $f_B$. Therefore, a buffer store is required. This is shown below in an embodiment of a coding device in accordance with the principles of the invention.

Marker Bits

Taking a bit stream generated in a code, as shown in line B of FIG. 4, a decoder can in principle recognize when a change of coding mode has to be effected so that the incoming binary characters can be decoded correctly. There are special cases, however, which require the addition of auxiliary bits or marker bits in order to enable a unique assignment. This is because in delta mode three equal bits can appear in the bit stream. It is also possible that the same bit value appears consecutively three times in the compressed delta bit stream. It is also possible that the uncompressed bit sequence '101'101'011' is converted to the compressed bit sequence '1'1'1 which, however, must not at all effect a switching to DPCM coding. These two different situations of three equal binary characters appearing consecutively in delta mode are differentiated by additional marker bits. The schematic principle for this is shown in FIG. 5.

Figure 5A:
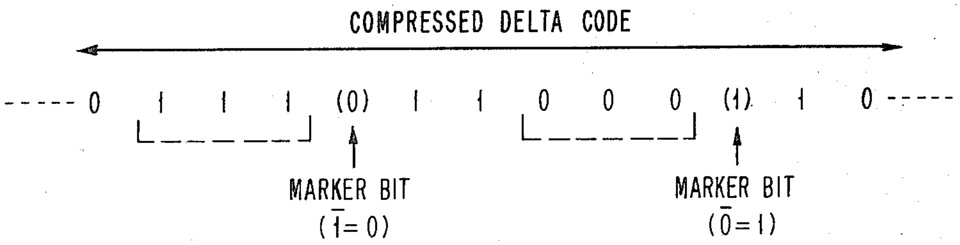

FIG. 5A shows two cases in which no switching is effected, i.e., in which the coding remains in delta mode. In compressed code one unequal marker bit is added to each group of three equal bits (which were generated by majority selection out of three uncompressed bits). Note that the marker bits are shown in the drawing in parentheses. These marker bits transmit no video information and are suppressed by the decoder, after the three preceding equal bits are each replaced by three reconstruction bits, and a mode switching is not effected.

Figure 5B:
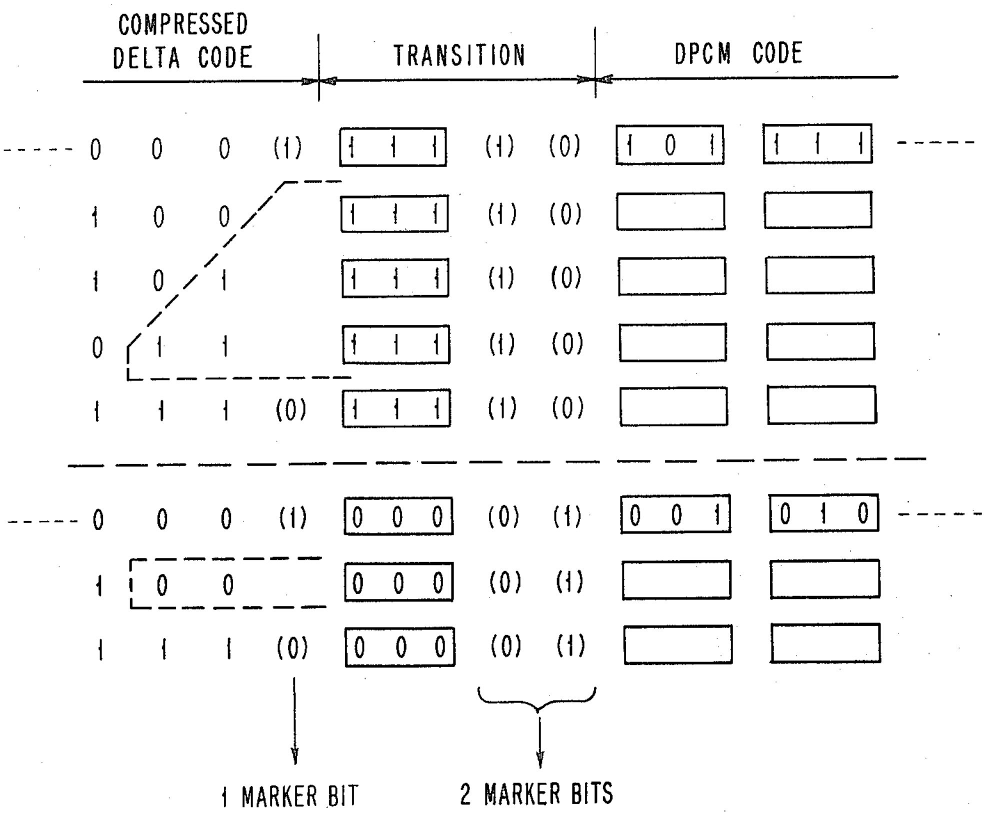

In FIG. 5B eight different cases are shown in which a switching from delta to DPCM mode is effected. To each group of three equal delta bits (in box) which are not compressed and which each represent a delta signal step, and which furthermore serve together as switching identification, there is first added an equal and thereafter an unequal marker bit (shown in parentheses). The first marker bit increases the number of consecutive equal bits to at least four so that the decoder can recognize that this is not the situation shown in FIG. 5A. The second unequal marker bit is required for separating because there could have been one or two more equal bits in front of the switching group and because after the switching, the same bits as those of the switching group could appear as DPCM code words.

When the decoder detects that it has received the second marker bit at a transition it effects the following:

a. switching to DPCM mode;

b. suppression of the two last received marker bits;

c. direct transfer of the three preceding equal bits to the signal reconstruction (no expansion);

d. expansion of the one or two equal bits which were probably received earlier (indicated by the broken lines in the second to fourth and in the seventh line), i.e, changing each of these compressed bits to three uncompressed bits before transfer to the signal reconstruction.

The single marker bits shown in the left part of FIG. 5B are not connected with the transition. They are of the same kind as shown in FIG. 5A and have only been introduced here to show the different possible cases. The bits appearing in the left part of FIG. 5B are always replaced by three delta bits (except for the marker bits). However, the bits situated within the broken lines can be processed, only if the complete following transition group inclusive marker bits has been received and recognized.

Within DPCM coding no marker bits are required because 3-bit-code words with unique meaning can only occur at a transition to delta coding.

Coder/Decoder

Referring now to FIGS. 6A and 6B, there is shown embodiments of a coder and a decoder in accordance with the above described coding method. In the coder, a video signal generated by a camera 11 is first limited in bandwidth by a low pass filter 13, for example, to 1 MHz. The video signal is transferred through an amplifier 15 to a subtraction means 17, in which the difference between the original analog video signal and a video signal reconstructed from the digital coded signal is developed. The difference signal is applied to a quantizer 19. The quantizer has 10 output lines, i.e. two lines for the positive and the negative delta quantization, and 8 lines for the eight possible DPCM levels. At any time one of the two delta lines and one of the eight DPCM lines is activated.

The quantizer output lines are connected to a logic unit 21. This logic unit 21 scans the quantized signals and determines the required coding mode from consecutive scanning values. It produces output signals which are used for the local reconstruction of the coded video signal by means of a digital-analog-converter 23 and an integrator 25, and it generates the bit sequences including a marker bt which must be transferred to the receiver. The logic unit 21 of the coder will be described in more detail in connection with FIG. 7A.

A clock generator 27 furnishes the basic and the triple sampling frequency $f_s$ and $3f_s$ to the logic unit 21. I the embodiment described herein, the frequencies are 2 MHz and 6 MHz respectively for a video bandwidth of 1 MHz. The bit sequences from the logic unit 21 are transferred to a dynamic buffer store 29. This buffer can receive the binary characters with different bit rates and transmit them at a constant bit rate $f_B$, which is determined by a frequency selector 31 which is controlled by clock generator 27. Bit rate $f_B$ is approximately 3 MHz.

Depending on the nature of the video signal to be coded, it is possible that there is a tendency of overflow or underflow in the buffer store 29. These extreme cases must be avoided. Therefore, a gain control 33 is provided which receives an input signal indicating the "filling" degree of the buffer, and which furnishes a control signal to the input amplifier 15. If the store gets too full (passing a limited value) the amplification in 15 is decreased. Due to this decrease all difference signals are diminished and more scanning values are coded in delta mode than in DPCM mode. This results in less bits being generated per time unit so that the buffer can again reach its means grade of filling. If the buffer is emptied below a predetermined level, the amplification is increased, thereby causing relatively more scanning values to be coded in DPCM. This causes the buffer to again be filled up.

Buffer storage means 29 consists of a parallel array of a plurality of dynamic shift registers, the inputs and outputs of which are cyclically connected by means of a stepping ring switch to the general input or output, respectively, of the buffer. When a group of adjacent shift registers (about half of all shift registers) are full, the register connected during the cycle "ahead" of the group, is just being filled up, while the register connected "behind" the group has just been emptied. The degree of filling at any one time can be determined from the relative position of the input ring switch and the output ring switch.

A suitable decoder is shown in the block diagram of FIG. 6B. At its input it has a buffer store 51 which corresponds to the coder-buffer 29. Logic unit 53, which will be described in more detail in connection with FIG. 7B, is connected to the output of the buffer 51. The logic unit 53 determines the mode of the incoming bit stream, suppresses the marker bits, and furnishes the delta and DPCM signals on separate output lines. For timing, the logic unit 53 receives clock signals $f_s$ and $3f_s$ from a clock regenerator 55 which derives the clock signals from the bit rate $f_B$ of the transmission channel. Additionally, the logic unit 53, furnishes a read control signal to buffer 51. Incoming binary characters are put into the buffer 51 with a constant bit rate $f_B$. Depending on the mode, however, the bits must be read out with two different frequencies: in delta mode one bit per time unit, in DPCM mode three bits per time unit.

The code signals are transferred from the logic unit 53 to a digital-analog converter 57, the analog output signal of which is used in integrating means 59 for reconstructing the video signal. The video signal proceeds through amplifier 61 and low-pass filter 63 to display unit 65 for generating a picture.

As discussed previously, the amplifier gain is controlled in the coder in order to keep the filling degree of the buffer as constant as possible. Therefore, the gain in the decoder must also be controlled depending on the filling degree of the buffer in order to compensate for dynamics of compression. Gain control 67 is provided for this purpose. When the buffer 29 in the coder starts to become overfilled due to the large number of signals coded in DPCM (higher bit rate), the gain must be decreased. When the corresponding signal interval is output from the store 51 in the decoder, the store 51 has a tendency to become empty because in DPCM mode the extraction bit rate at the buffer is higher than average. Therefore, the gain must be increased to finally reach the correct amplitude value of the analog signal.

Logic Units

Now referring to FIGS. 7A and 7B, there is shown block diagrams of the logic units 21 and 53 respectively. At the input of the logic unit 21 of the coder, a scanner 81 is provided which is connected to the output lines of the quantizer, eight parallel lines for DPCM signals and two lines for delta signals. One line of each of these two groups is always activated in accordance with the characteristics shown in FIG. 3. The delta signal can be given values which are independent of the quantizer by bit force means 83 using control signals S1 and S2. The purpose of this bit force means 83 is described in more detail further on in this specification. At this point it is sufficient to understand that means 83 lets the delta signal from the quantizer pass unchanged.

In delta mode, scanner 81 scans the two delta lines with a frequency $3f_s$ and sends the generated pulses on the two delta lines to a mode control 85, to digital-analog converter 23 (FIG. 6A), and to majority logic 87. In DPCM mode the eight DPCM lines are scanned with the basic scanning frequency $f_s$ and the pulses generated are sent on the eight output lines to mode control 85, to digital-analog converter 23 in the feed-back path and to a combined coder with parallel-serial converter 91.

The mode control 85 is so constructed that it can determine from the combination of consecutive scanning pulses if a switching from delta mode to DPCM mode or vice versa is necessary (as already explained in connection with FIGS. 2 and 4). After each switching operation one of its two control outputs with the corresponding control signal "DELTA" or "DPCM" is permanently activated. These signals are used for controlling scanner 81.

In delta mode, majority logic 87 generates from each three consecutive scanning pulses (0 or 1 depending on the line) three delta bits, and determines from each such group of three bits one majority bit according to the table of FIG. 2. Majority logic 87 also furnishes the majority bits with a bit rate fs to combination means 93. If, however, a group comprises three equal bits, the majority logic 87 furnishes these three bits unchanged, but with a higher bit rate, to combination means 93 while simultaneously, it generates a control signal "transition" for the marker bit generator 89.

The marker bit generator 89 keeps the three last delta majority bits from circuitry 87 in a shift register in order to determine whether they are equal. If they are equal, it furnishes on its output line a single marker bit which is different from the three equal majority bits. If the marker bit generator 89 receives the control signal "transition," it furnishes at its output, after three equal delta bits (uncompressed bits) have appeared, one equal bit and thereafter a complementary marker bit, in accordance with FIG. 5.

In DPCM mode, the combined coder with parallel-serial converter 91 generates three-bit-DPCM code words from the received scanning pulses at a rate *fs*. However, the single bits at its output are provided sequentially at a bit rate 3*fs*. The bits occurring asynchronously on the three output lines of the logic unit 21 are combined in combination means 93 to a single sequential bit stream and transferred to buffer 29. At the occurrence of any output bit, a bit time signal is also transferred to the buffer input ($t_1$, $t_2$, $t_3$).

The logic unit 53 of the decoder, as shown in FIG. 7B comprises at its input, means 101 for marker bit analysis and mode control. In delta mode, means 101 receives the sequential bit stream extracted from the buffer and recognizes if marker bits are present and if a switching to DPCM mode is necessary in accordance with the scheme of FIG. 5. In DPCM mode, means 101 can recognize from two consequitive three-bit-groups whether a switching to delta mode is necessary. This recognition operation is accomplished by a shift register and a plurality of coincidence gates. Short-duration control signals ("marker bit," "transition") and permanent control signals ("Delta," "DPCM") are furnished by means 101 to the other parts of the logic unit. Means 103 provides marker bit suppression which eliminates all marker bits from the bit stream depending on the corresponding control signal. Switch 105 transfers the bit stream depending on the mode control signal either to a DPCM line or a delta line. It should be recognized that means 101, 103 and 105 could be combined into one unit, or they could be distributed in some other way.

DPCM bits from switch 105 are combined in serial-parallel converter 107 to groups of three, which groups are transferred in parallel on three lines to the digital-analog converter 57 (FIG. 6B) at a bit rate $f_s$. Delta bit reconstruction unit 109 generates for each single delta bit, which is applied to it, a group of three delta bits in accordance with the table of FIG. 2 and provides these groups at its output sequentially to the digital-analog converter 57 at a bit rate $3f_s$. If the control signal line "transition" from mode control means 101 is activated, three (equal) delta bits are transferred unchanged to the output of unit 109.

Because the buffer store 51 must be read out at different bit rates, depending on the mode, the logic unit 53 in the decoder generates an appropriate read control signal. For this purpose, AND-gages 111 and 113 and an OR-gate 115 are provided which furnish, in delta mode, the clock signal $f_s$, and in DPCM mode the clock signal $3f_s$ as read control signal.

Improvements for Prevention of Edge Noise

In still or slow moving pictures it is possible that vertical edges are "busy " because the switching from delta mode to DPCM mode in consecutive pictures does not occur at the same point. This phenomenon can be seen from FIG. 4. From point P, two different courses of the reconstructed video signal are possible due to slight signal shifts or noise signals, i.e., one represented by the heavy line and the other by the broken line. If in consecutive picture scannings a multiple changing between the two courses occurs, the respective edge becomes "busy," which is considered disturbing to the viewer. As a solution to this problem, look-ahead circuitry can be provided in the coder, the principle of which is shown in FIG. 6C. The look-ahead circuitry consists of a delay element 35 having a delay of about $T_s = 1/f_s$, connected at the plus-input of subtracting means 17. Two comparing circuits 37 and 35 compare the difference between the minus input of the subtracting means, or the reconstructed video signal from the output of integrator 25 (FIG. 6A), and the input of delay element 35, with a positive and a negative threshold value $+U_T$ and $-U_T$, and the bit force means 83 (FIG. 7A) in the delta line at the input of the logic unit. If one of the comparing circuits detects that during the next interval $T_s$ the video difference signal will rapidly rise of fall, then a control signal will appear on line S1 or S2, respectively, which ensures that during the next three delta scanning periods the same binary delta signal is applied to scanner 81 independent of the output signal of the quantizer 19. In this way a switching to DPCM coding is always effected immediately at the start of a signal rise or signal fall, respectively, so that no edge noise can occur.

Additional Bit Sequences for Reduction of Transmission Error Effects

If during transmission single bits are changed, an undesired mode switching could occur or a desired mode switching could be prevented. This could cause a major error in the reconstructed video signal (stroke effect). In order to reduce the effect of such an error on the end of one picture line, the coder must generate at the end of each picture line an additional bit sequence (e.g., with the aid of a small read-only store which is read out stepwise), which effects in the decoder a switching to delta mode. A suitable bit sequence would be, -- 10100010111010001 --. The additional bit sequence enforces, independent of the mode in which the decorder was at the end of the line, a switching to delta mode. This is so even if the preceding bit sequence ended with an uncomplete DPCM code word (only one or two bits). With suitable construction of the decoder it is possible that the additional switching bit sequences will not be reconstructed as a visible video signal (e.g., by the addition of counters, which switch the beam off after a fixed number of clock periods). Since the coder and decoder use delta coding at the beginning of each picture line a mode error can never propagate over the end of a line. For synchronizing the line start with the bit stream, the switching bit sequence could be extended by a bit sequence which violates the usual code rules, for example, a sequence of more than six equal bits (according to FIG. 5 this is usually not possible).

Possible Bit Rate

When a video signal is coded according to the disclosed method, one requires per scanning interval $T_s = 1/fs$, (i.e., per picture element) in delta mode, one bit, and in DPCM mode, three bits. Assuming that in picture information the parts with minor amplitude changes are predominant and that for delta coding there is a probability $p_1 = 0{,}8$, and for DPCM coding a probability of $p_2 = 0{,}2$, then there will be a mean bit number per scanning interval of $N_B = 1 \cdot p_1 + 3 \cdot p_2 = 0{,}8 + 3 \cdot 0{,}2 = 1{,}4$. This number will be slightly increased by the required marker bits, by about 10 percent.

What is claimed is:

1. A system for coding and decoding video signals comprising:

means for scanning an image for producing video signals;

delta modulation coding means for coding said video signals;

differential pulse code modulation coding means for coding said video signal code;

coder logic means for receiving the output of both said coding means and selecting the output code of one of said coding means depending on the course of the amplitude represented by the coded output signals;

said coder logic means having feedback output lines which provide the coded video signals from said coding means as output signals;

reconstruction means connected to said feedback output lines for reconstructing said video signals and providing the reconstructed video signals as feedback signals;

line output means connected to said coder logic means for transmitting said selected output code signals to the decoder;

said decoder having decoder logic means for determining the code selected by said coder logic means;

said decoder further having means for decoding said first and second codes and means for reconstructing said video signal.

2. The system as defined in claim 1 further comprising:

subtraction means for forming a difference signal from the addition of said video signals and the negative of said feedback signals;

said coding means forming the output codes from said difference signal.

3. The system as defined in claim 2 wherein said logic means further comprises:

mode control means for determining which of said output codes are to be selected;

scanning means for scanning the quantizer output signals at one of two freqeuncy scanning rates and providing scanned output signals;

said mode control means receiving as input said scanned output signals and determining selection of the proper code.

4. The system as defined in claim 3 wherein said mode control means further comprises:

first determination means for determining during delta mode operation that during three consecutive scanning periods at a scanning frequency of three times a basic frequency, the quantizer output signals indicate like signs;

means responsive to said first determination means for changing the selection of coding means to differential pulse code mode;

second determination means for determining during operation of the selected differential pulse code, during two consecutive scanning periods at a basic scanning frequency, that the quantizer output signals indicate different signs and that the quantizer output signals correspond during the last scanning period to the smallest positive or negative value representable in differential pulse code modulation;

said second determination means changing the output control signal indicating a switch in selection of the coding means to delta modulation.

5. The system as defined in claim 3 wherein said logic means further comprises:

majority logic means for comparing consecutive binary groups of bits during selection of delta modulation coding means and providing three consecutive binary characters when three consecutive binary groups are equal and prviding the binary character output when three consecutive binary groups are different from each other.

6. The system as defined in claim 5 further comprising combination means for combining the binary character output from said logic means to form the output signal to be transmitted.

7. The system as defined in claim 6 further comprising storage means for receiving the output of said combination means at a variable bit rate and delivering the binary characters from the logic means at a constant bit rate to a transmission line output.

8. The system as defined in claim 7, further comprising:

control means for monitoring the rate at which binary information is loaded into said storage means;

said control means delivering an output signal indicative of the filling rate of said storage means;

said control means output signal being used to control the portion of the video signal which is coded during selection of said differential pulse code modulation means.

9. The system as defined in claim 3 further comprising:

look ahead means having a delay element for delaying the video signal that is to be coded;

means for generating a difference signal indicating the differential between the undelayed video signal and the reconstructed video signal;

comparing circuits for comparing the differential signal with a threshold signal and generating a control signal corresponding to the comparison results;

force means receiving said control signals and determining that at least one line output from said coding means is provided to said logic means.

10. A method for coding and decoding video signals comprising:

alternately coding said video signals by either delta modulation or differential pulse code modulation;

examining the amplitude of the video signals;

selecting either delta modulation or differential pulse code modulation in accordance with the detected amplitude of said video signals;

grouping code bits to represent video signal difference values;

examining said code bit groups during decoding for indicating transitions from one coding mode to another.

11. The method as defined in claim 10 wherein delta modulation is performed at a scanning frequency three times the rate of a basic scanning frequency;

generating delta modulation coding bits for transmission according to the code, for 100 and 010 and 001 use 0 for 110 and 101 and 011 use 1 for 000 use 000 for 111 use 111;

determining the occurence of a delta modulation bit group 000 and 111;

switching from delta modulation to differential pulse code modulation coding when the determination of the delta bit groups is positive.

12. The method as defined in claim 11 further comprising:

examining consecutive differential pulse code modulation code words;

switching from differential pulse code modulation coding to delta modulation coding when consecutive code words alternately represent values with different signs.

* * * * *